(12) United States Patent
Sekino et al.

(10) Patent No.: US 9,321,415 B2
(45) Date of Patent: Apr. 26, 2016

(54) POWER-SUPPLYING SYSTEM

(71) Applicant: Yazaki Corporation, Tokyo (JP)

(72) Inventors: Tsukasa Sekino, Makinohara (JP);
Hiroshi Yamashita, Makinohara (JP);
Daisuke Okamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 83 days.

(21) Appl. No.: 14/509,426

(22) Filed: Oct. 8, 2014

(65) Prior Publication Data
US 2015/0102182 A1    Apr. 16, 2015

(30) Foreign Application Priority Data

Oct. 11, 2013  (JP) ................. 2013-214077

(51) Int. Cl.
| | |
|---|---|
| H05K 5/02 | (2006.01) |
| B60R 16/02 | (2006.01) |
| F16C 11/04 | (2006.01) |
| H02B 1/44 | (2006.01) |
| H02G 11/00 | (2006.01) |
| B60R 16/027 | (2006.01) |
| H02B 1/38 | (2006.01) |
| H02G 3/04 | (2006.01) |
| H02G 3/06 | (2006.01) |

(52) U.S. Cl.
CPC .......... *B60R 16/0215* (2013.01); *B60R 16/027* (2013.01); *H02G 11/006* (2013.01); *H02B 1/38* (2013.01); *H02B 1/44* (2013.01); *H02G 3/0468* (2013.01); *H02G 3/0691* (2013.01)

(58) Field of Classification Search
CPC ............. B60R 16/0215; B60R 16/027; H05K 5/0266; H02B 1/38; H02B 1/44; F16C 11/044
USPC ............ 248/49, 65, 67.7, 68.1, 70, 587, 590; 174/68.1, 68.3, 69, 72 A, 97; 439/34
See application file for complete search history.

(56) References Cited

U.S. PATENT DOCUMENTS

| | | | | |
|---|---|---|---|---|
| 8,227,693 B2 * | 7/2012 | Katou | .................. | B60R 16/027 |
| | | | | 174/68.1 |
| 8,242,366 B2 * | 8/2012 | Katou | .................. | B60R 16/027 |
| | | | | 174/68.1 |
| 9,173,311 B2 * | 10/2015 | Ikeda | .................... | B60R 16/027 |
| 2007/0119610 A1 * | 5/2007 | Kisu | .................... | H02G 11/006 |
| | | | | 174/72 A |
| 2015/0108289 A1 * | 4/2015 | Terada | .................. | B60R 16/023 |
| | | | | 248/70 |
| 2015/0360628 A1 * | 12/2015 | Sekino | .................... | F16C 11/04 |
| | | | | 16/304 |

FOREIGN PATENT DOCUMENTS

JP    2007-151257 A    6/2007

* cited by examiner

*Primary Examiner* — Tan Le
(74) *Attorney, Agent, or Firm* — Locke Lord LLP

(57) ABSTRACT

An objective of the present invention is to provide a power-supplying system that can restrain an increase in size thereof with a spring equipped therewith. A first end of a rolling spring projects inwardly, and a first locking section is formed on a primary shaft of a turning member, the primary shaft being disposed inside the rolling spring so that the turning member can engage with the rolling spring at the inside of the rolling spring, thereby restraining an increase in size thereof.

4 Claims, 4 Drawing Sheets

POWER-SUPPLYING SYSTEM

CROSS REFERENCE TO RELATED APPLICATIONS

The present invention relates to a power-supplying system comprising a support fixed to one of a sliding door and a vehicle body, a turning member pivotally supported by the support and allowing wire harness to be inserted thereinto, and a rolling spring for biasing the turning member in a predetermined rotation direction.

TECHNICAL FIELD

Conventionally, a power-supplying system that includes a support fixed to a sliding door, a turning member pivotally supported by a support and allowing wire harness to be inserted thereinto, and a biasing member (spring) biasing the turning member in a predetermined rotation direction, is investigated (refer to PTL 1). The power-supplying system shown in the PTL 1 is configured in such a manner that wire harness is bent in a predetermined rotation direction when the sliding door is opened or closed by the biasing member that biases the turning member.

CITATION LIST

Patent Literature

PTL 1: Japanese Published Patent Application No. 2007-151257

SUMMARY OF INVENTION

Technical Problem

However, according to the power-supplying system shown in the Patent Literature 1, the entire system becomes increased in size by biasing the turning member with the spring.

The objective of the present invention is to provide a power-supplying system that can restrain the increase in size with a spring equipped therewith.

There is provided a power-supplying system of an aspect of the present invention comprising:

a support fixed to one of a sliding structure and a fixing structure;
a turning member pivotally fixed to the support and allowing wire harness to be inserted thereinto;
a rolling spring for biasing the turning member in a predetermined rotation direction; and
a guide member for guiding wire harness to one of the sliding structure and the fixing structure;
wherein the rolling spring comprises a first end projecting inwardly and a second end projecting outwardly,
the turning member comprises a primary shaft projecting toward a first side in an axial direction, the primary shaft allowing wire harness to be inserted thereinto, and a secondary shaft formed at a second side in the axial direction,
the primary shaft comprises a first locking section disposed inside the rolling spring, the first locking section engaging with the first end of the rolling spring,
the support comprises an accommodating member for accommodating the rolling spring, and
the guide member comprises a second locking section assembled to the support at the first side in the axial direction, the second locking section engaging with the second side of the rolling spring.

According to the aspect of the present invention, the first end of the rolling spring projects inwardly and the first locking section is formed on the primary shaft so that the turning member engage with the rolling spring at the inside of the rolling spring, thereby restraining an increase in size thereof.

In the aspect of the present invention, it is preferable that the guide member comprises an engaged part to be engaged with the support, the support comprising a temporary locking part engaging with the first end of the rolling spring and an engaging part engaging with the engaged part, wherein the power-supplying system changes from a neutral condition to an engaging condition, wherein in the neutral condition, the temporary locking part engages with a first end of the rolling spring and the second locking section engages with a second end thereof, while in the engaging condition, the support and the guide member are relatively displaced in the direction opposite to the biasing direction of the rolling spring so that the rolling spring is elastically deformed and the engaging part engages with the engaged part, wherein the primary shaft is supported by the support in the engaging condition, whereby the first locking section engages with the first end of the rolling spring.

According to the above, in the engaging condition in which the rolling spring is elastically deformed, the first end engages with the first locking section so that a biasing force (initial biasing force) is applied to the rolling spring even when the rolling spring rotates in the maximum degree in the biasing direction, whereby wire harness can be bent in a predetermined direction. Further, in the engaging condition, the engaging part engages with the engaged part so that the initial biasing force can be maintained and the easiness of assembly can be improved without applying a reactive force against the initial biasing force when the primary shaft is being supported by the support.

Further, in the aspect of the present invention, it is preferable that the first locking section comprises an inclined portion and a concaved portion, the inclined portion extends obliquely from the second side toward the first side in the axial direction along the biasing direction, and the concaved portion is formed in a concave shape in the biasing direction at a position closer to the second side in the axial direction than the inclined portion.

According to the above, the primary shaft is relatively displaced from the second side to the first side in the axial direction with respect to the rolling spring so that the first end of the rolling spring is rendered along the inclined portion and deforms in the direction opposite to the biasing direction, the first end is engaged with the concaved portion by a restorative force thereof, whereby the first end of the rolling spring can be easily engaged with the first locking section.

According to the power-supplying system of the present invention as the above, due to a projection of the first end of the rolling spring inwardly and a formation of the first locking section on the primary shaft, the increase in size can be restrained with a spring equipped therewith.

DESCRIPTION OF EMBODIMENTS

Figure 1:
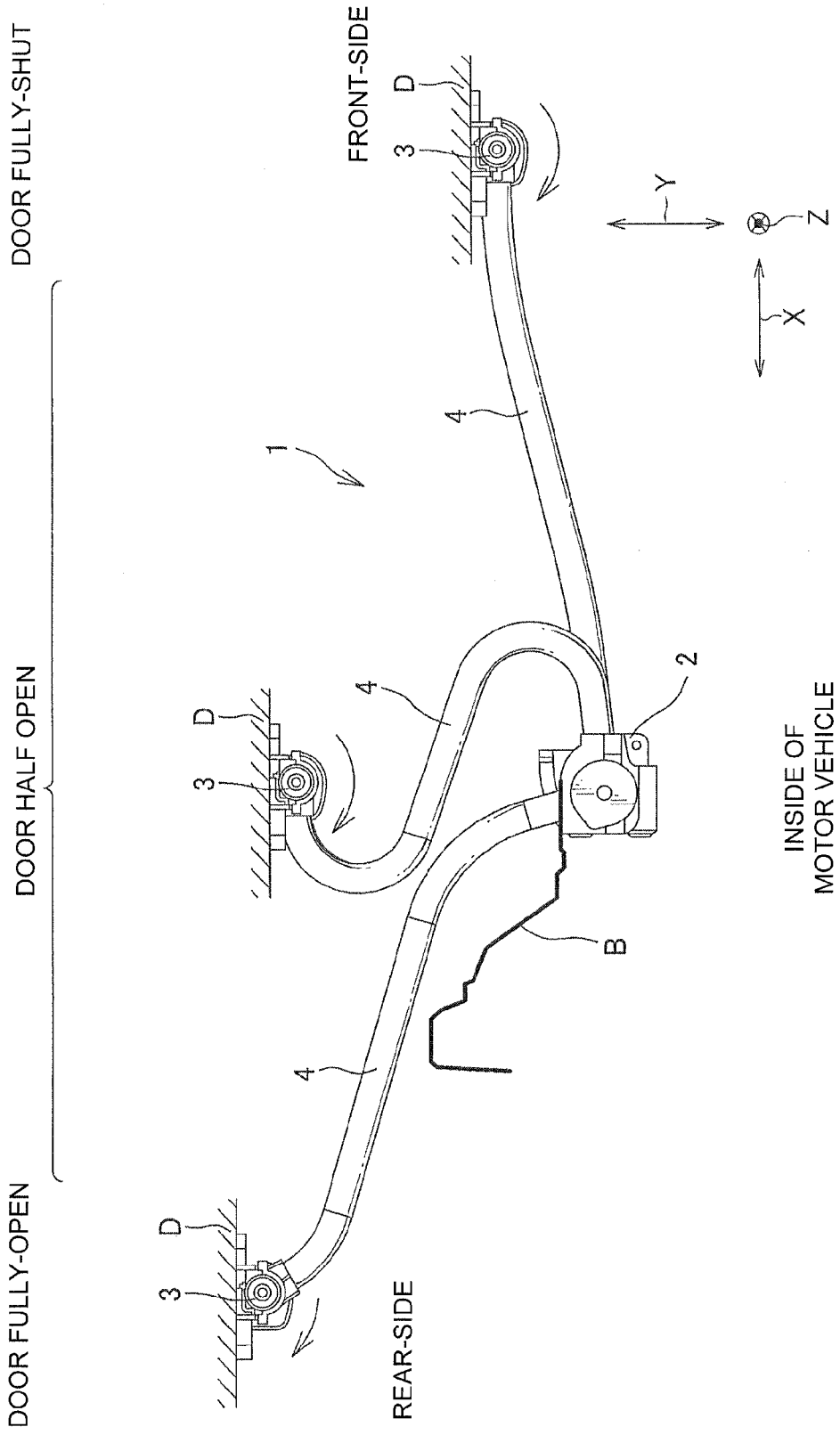
FIG. 1 is a plan view showing a operation of a power-supplying system of the present invention.

The embodiments of the present invention are explained as follows on the basis of the drawings. A power-supplying system 1 of the present embodiment is mounted on a not-shown motor vehicle, the power-supplying system 1 is adopted to include a body-side unit 2 disposed on a motor vehicle body B (fixing structure), a door-side unit 3 disposed in a sliding door D (sliding structure) as a sliding structure, a corrugate tube 4 (outer sheath) disposed between the body-side unit 2 and the door-side unit 3, and allowing not-shown wire harness to be inserted thereinto. The power-supplying system 1 supplies electrical power with not-shown electric appliances on a sliding door or, sends or receives electrical signal via wire harness from not-shown batteries or controllers disposed in the motor vehicle body B. Further, X-direction, Y-direction, and Z-direction of the present embodiment are shown in FIG. 1. The corrugate tube 4 is rotatably supported by the body-side unit 2 and the door-side unit 3 along an axis in the Z-direction that is up-down direction of the motor vehicle, the sliding door is opened and closed in the X-direction that is front-rear direction of the motor vehicle.

Figure 2:
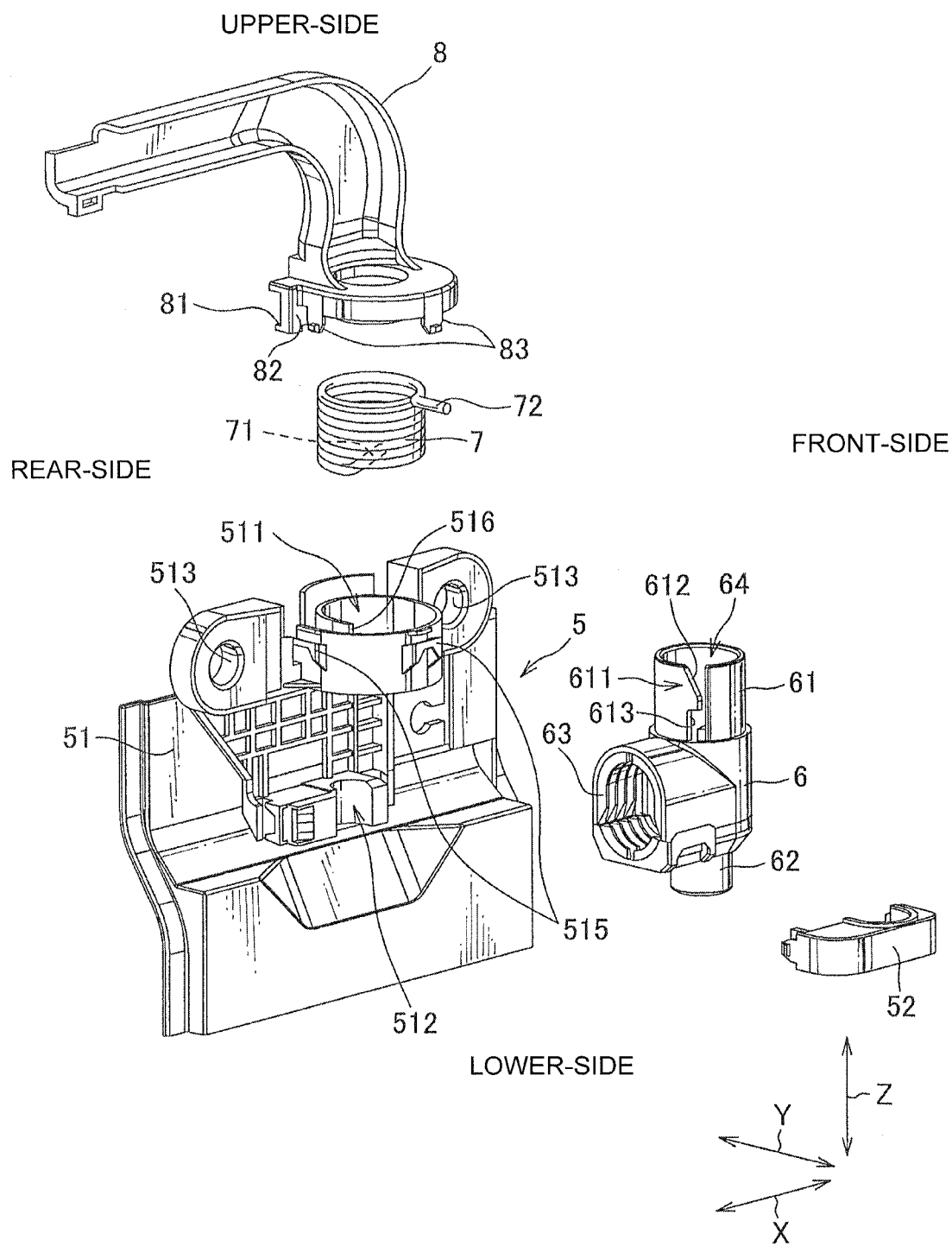
FIG. 2 is an exploded perspective view showing a main part of the power-supplying system of the present invention.

The door-side unit 3, as shown in FIG. 2, is adapted to include a support 5 fixed to the sliding door D, a turning member 6 pivotally supported by the support 5 and allowing wire harness to be inserted thereinto, a rolling spring 7 biasing the turning member 6 in a predetermined rotation direction (direction indicated by an arrow in FIG. 1), a guide member 8 guiding wire harness backwardly along the X-direction toward the sliding door.

In the turning member 6, a primary shaft 61 projecting upwardly along the Z-direction, a secondary shaft 62 projecting downwardly along the Z-direction, and a first insertion portion 63 allowing wire harness to be inserted thereinto in an approximate parallel direction of the X-Y plane, are formed. Further, at the inside of the primary shaft 61, a second insertion portion 64 allowing wire harness to be inserted thereinto is formed. Further, in the primary shaft 61, a first locking section 611 engaging with a first end 71 of the rolling spring 7 is formed. The first locking section 611 is composed of a inclined portion 612 extending obliquely from the lower-side toward the upper-side in the Z-direction along the biasing direction of the rolling spring 7 (clockwise direction in FIG. 2), and a concaved portion 613 formed in a concave shape along the biasing direction at lower position than the inclined portion 612 in the Z-direction.

Figure 4A:
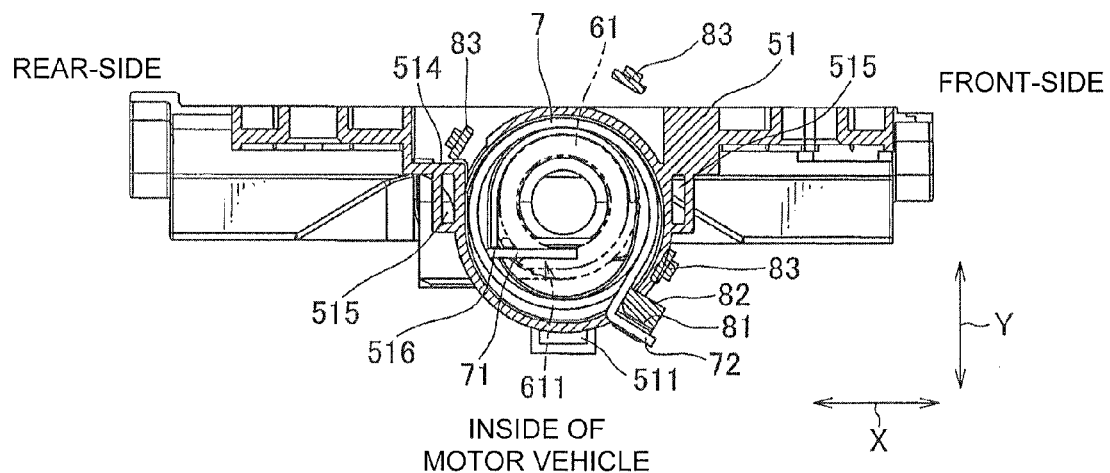
FIG. 4A is a partial cross-sectional view showing a main part of the power-supplying system of the present invention.
Figure 4B:
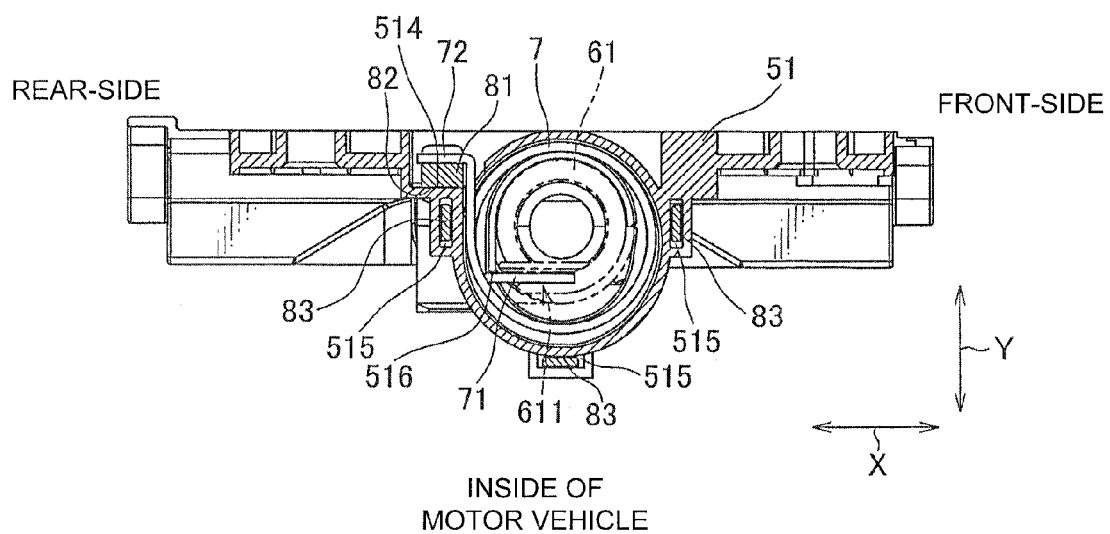
FIG. 4B is a partial cross-sectional view showing a main part of the power-supplying system of the present invention.

The support 5 is adapted to include a body portion 51 fixed to the sliding door D, a bearing 52 for supporting the secondary shaft 62. The body portion 51 includes an accommodating member 511 for supporting the primary shaft 61 and for accommodating the rolling spring 7, a second shaft receiving portion 512 with which the bearing 52 is being assembled so as to support the secondary shaft 62, a fixing hole 513 into which fixing members such as not shown bolts are inserted so as to be fixed to the sliding door D, an engaging part 514 engaging with later-described engaged part 82 of the guide member 8 as shown in FIGS. 4A and 4B, a projection receiving portion 515 allowing later-described projection portion 83 of the guide member 8 to be inserted thereinto. At the inside of the accommodating member 511, a temporary locking part 516 engaging with the first end 71 of the rolling spring 7 is formed.

The corrugate tube 4 is inserted into the first insertion portion 63 while being fixed thereto in the door-side unit 3. Only wire harness is bent toward the upper-side in the Z-direction in the turning member 6 while passing through the second insertion portion 64 so as to be guided to the inside of the sliding door (space formed between door-panel and door trim) by the guide member 8.

Figure 3:
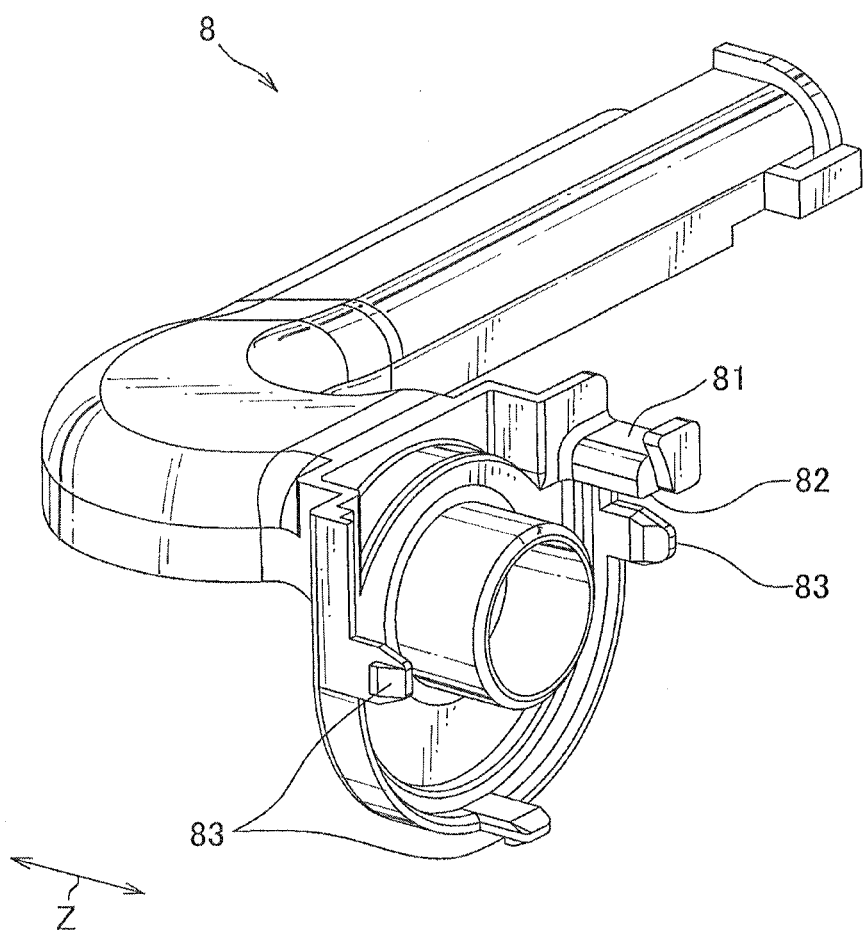
FIG. 3 is a perspective view showing a main part of the power-supplying system of the present invention.

The guide member 8 includes, as also shown in FIG. 3, a second locking section 81 projecting toward the lower side in the Z-direction so as to engage with the second end 72 of the rolling spring 7, an engaged part 82 formed oppositely to the second locking section 81, and an the projection portion 83 projecting toward the lower side in the Z-direction.

Next, an assembly order of the door-side unit 3 is explained. FIGS. 4A and 4B show a cross-sectional view of accommodating the rolling spring 7 in the accommodating member 511 while engaging the guide member 8 with the body portion 51. First, as shown in FIG. 4A, a neutral condition is established, in the neutral condition the temporary locking part 516 of the body portion 51 engages with the first end 71 of the rolling spring 7 while the second locking section 81 of the guide member 8 engages with the second end 72 thereof. Next, the guide member 8 is rotated in the clockwise direction in FIGS. 4A and 4B, that is, the direction opposite to the biasing direction of the rolling spring 7, relative to the body portion 51 so as to render the rolling spring 7 elastically deformed, approximating the body portion 51 to the guide member 8 in the Z-direction, whereby the engaged part 82 engages with the engaging part 514 while the projection portion 83 is inserted into the projection receiving portion 515 and the guide member 8 is assembled to the body portion 51, resulting in an establishment of the engaging condition as shown in FIG. 4B. In the meantime, initial biasing force is applied to the rolling spring 7 and the engaging part 514 engages with the engaged part 82, whereby the initial biasing force is maintained.

Next, the corrugate tube 4 extending from the body-side unit 2 is inserted into the turning member 6 so that wire harness is rendered to pass therethrough from the first insertion portion 63. This wire harness is inserted into the body portion 51 and the guide member 8, and the turning member 6 is approximated to the body portion 51 that is integrated with the guide member 8 in the Z-direction. Thereafter, the primary shaft 61 is inserted into the further inside of the rolling spring 7 being received by the accommodating member 511. At this time, with rendering the first end 71 of the rolling spring 7 being along the inclined portion 612, as the primary shaft 61 is being received to the accommodating member 511 toward the upper side in the Z-direction, the rolling spring 7 is elastically deformed in the direction opposite to the biasing direction (counterclockwise direction in FIGS. 4A and 4B) and thereafter, the first end 71 is engaged with the concaved portion 613 by a resilience thereof. Thus, the turning member 6 becomes to be biased by rolling spring 7. Further, the bearing 52 is assembled to the second shaft receiving portion 512 so that the secondary shaft 62 is supported by the support 5, thereby completing the assembly of the door-side unit 3. The door-side unit 3 is fixed at an appropriate position of the sliding door D with bolts being inserted to the fixing hole 513.

Next, operations of the door-side unit 3 when the sliding door opens and closes are explained. In a fully closed state shown in FIG. 1, the door-side unit 3 turns the first insertion portion 63 backward in the X-direction with the initial biasing force, that is, the door-side unit 3 supports the corrugate tube 4 backward in the X-direction. Further, with the turning member 6 being biased in clockwise direction in FIG. 1 by the rolling spring 7, when the sliding door is half open, the corrugate tube 4 becomes bent in S-shape and the door-side unit 3 maintains a state in which the door-side unit 3 turns the first insertion portion 63 backward in the X-direction. On the other hand, when the sliding door is fully open as shown in FIG. 1, the turning member 6 rotates in the counterclockwise direction, and the door-side unit 3 falls within a state in which the door-side unit 3 turns the first insertion portion 63 toward the inside of the motor vehicle in the Y-direction, that is, a state in which the door-side unit 3 supports the corrugate tube 4 turning toward the inside of the motor vehicle in the Y-direction.

According to the present embodiment, such effects as follows can be obtained. That is, effects that with the first end 71 of the rolling spring 7 projecting inwardly and the first locking section 611 being formed on the primary shaft 61, the turning member 6 can engage with the rolling spring 7 at the inside of the rolling spring, thereby restraining an increase in size of the door-side unit 3.

Furthermore, with the initial biasing force being applied to the turning member 6, the corrugate tube 4 can be bent in a predetermined direction. Further, because the engaging part 514 engages with the engaged part 82 in the engaging condition, the initial biasing force can be maintained and the first end 71 of the rolling spring 7 can be engaged with the first locking section 611 without rotating the turning member 6 against the initial biasing force so that the easiness of assembly can be improved.

Further, with both the inclined portion 612 and the concaved portion 613 being formed on the first locking section 611, the primary shaft 61 can be inserted into the accommodating member 511 from the lower side to the upper side in the Z-direction, the first end 71 of the rolling spring 7 can be easily engaged with the first locking section 611, thereby improving the easiness of assembly.

Although the present invention has been fully described by way of the aforementioned embodiments, it is to be understood that various changes and modifications as follows that can attain the objectives of the present invention should be construed as being within the scope of the present invention. For example, although the second locking section 81 and the engaged part 82 are formed in the guide member 8 and the engaging part 514 is formed in the body portion 51 in the aforementioned embodiments, the members such as the second locking section 81, the engaged part 82, and the engaging part 514 may not be formed therein and a configuration in which the initial biasing force is not applied to the turning member 6 may be adopted. Further, a configuration in which the engaged part is formed on the turning member 6 and the turning member 6 is supported in a manner rotating in the direction opposite to the biasing direction and relative to the body portion 51 so that the initial biasing force is applied thereto may be adopted.

Further, in the aforementioned embodiments, although the first locking section 611 includes the inclined portion 612 and the concaved portion 613, the inclined portion 612 may not be included therein. Further, the first locking section 611 may include an inclined portion inclining oppositely to the incline of the inclined portion 612 without including the concaved portion 613 therein. The first locking section may be formed with the approximately parallel surfaces in the Z-direction. Any appropriate configurations in which the first end 71 of the rolling spring 7 can be engaged therewith may be applicable.

Further, in the aforementioned embodiments, although the turning member 6 is formed such that having both the primary shaft 61 and the secondary shaft 62 in an integrated manner, a member having the primary shaft 61 may be separated from a member having the secondary shaft 62.

Further, in the aforementioned embodiments, the accommodating member 511 for supporting the primary shaft 61 is integrated with the body portion 51 while the bearing 52 that supports the secondary shaft 62 is separated from the body portion 51, a bearing configured by assembling separated members may support the primary shaft 61 and a bearing formed integrally with the body portion 51 may support the secondary shaft 62. At least one of the two bearings that supports the primary shaft 61 and the secondary shaft 62 respectively may have members being provided separately.

Further, in the aforementioned embodiments, although the secondary shaft 62 projects downward in the Z-direction, a configuration in which an axial portion projecting upward is formed in the body portion 51 while the secondary shaft is supported by the body portion 51 with the secondary shaft being formed in a concave shape, may be adopted.

Further, in the aforementioned embodiments, although the support 5, the turning member 6, the rolling spring 7, and the guide member 8 in the door-side unit 3 are exemplified, the body-side unit 2 may have the same configuration as the above.

Further, in the aforementioned embodiments, although the power-supplying system 1 is mounted on motor vehicles, the power-supplying system 1 may be mounted on boats and ships, aircraft, or the like. A system in which electric power is transmitted between the fixing structure and the sliding structure provided slidably on the fixing structure may be applicable.

Although configurations and methods for performing the present invention in the best mode have been fully described by way of example with reference to the accompanying drawings, it is to be understood that various changes and modifications such as in their shapes, materials, and quantities will be apparent to those skilled in the art. Therefore, unless otherwise such changes and modifications depart from the scope of the present invention hereinafter defined, they should be construed as being included therein. Accordingly, a shape, material and the like described above merely serve as exemplification for facilitating an understanding of the invention, and do not serve as any limitations on the invention, so that what is described by a name of a component for which the description of the shape, material and the like are partially or totally removed is also within the scope of the invention.

REFERENCE SIGNS LIST 1 power-supplying system
5 support
6 turning member
7 rolling spring
8 guide member
61 primary shaft
62 secondary shaft
71 first end
72 second end
81 second locking section
82 engaged part
511 accommodating member
514 engaging part
516 temporary locking part
611 first locking section
612 inclined portion
613 concaved portion

What is claimed is:
1. A power-supplying system comprising:
a support fixed to one of a sliding structure and a fixing structure;

a turning member pivotally fixed to the support and allowing wire harness to be inserted thereinto;
a rolling spring for biasing the turning member in a predetermined rotation direction; and
a guide member for guiding wire harness to one of the sliding structure and the fixing structure;
wherein the rolling spring comprises a first end projecting inwardly and a second end projecting outwardly,
the turning member comprises a primary shaft projecting toward a first side in an axial direction, the primary shaft allowing wire harness to be inserted thereinto, and a secondary shaft formed at a second side in the axial direction,
the primary shaft comprises a first locking section disposed inside the rolling spring and engaging with the first end of the rolling spring,
the support comprises an accommodating member for accommodating the rolling spring, and
the guide member comprises a second locking section assembled to the support at the first side in the axial direction and engaging with the second side of the rolling spring.

2. The power-supplying system according to claim 1,
wherein the guide member comprises an engaged part to be engaged with the support, the support comprising a temporary locking part engaging with the first end of the rolling spring and an engaging part engaging with the engaged part,
wherein the power-supplying system changes from a neutral condition to an engaging condition, wherein in the neutral condition, the temporary locking part engages with a first end of the rolling spring and the second locking section engages with a second end thereof, while in the engaging condition, the support and the guide member are relatively displaced in the direction opposite to the biasing direction of the rolling spring so that the rolling spring is elastically deformed and the engaging part engages with the engaged part,
wherein the primary shaft is supported by the support in the engaging condition, whereby the first locking section engages with the first end of the rolling spring.

3. The power-supplying system according to claim 1,
wherein the first locking section comprises an inclined portion and a concaved portion, the inclined portion extends obliquely from the second side toward the first side in the axial direction along the biasing direction, and the concaved portion is formed in a concave shape in the biasing direction at a position closer to the second side in the axial direction than the inclined portion.

4. The power-supplying system according to claim 2,
wherein the first locking section comprises an inclined portion and a concaved portion, the inclined portion extends obliquely from the second side toward the first side in the axial direction along the biasing direction, and the concaved portion is formed in a concave shape in the biasing direction at a position closer to the second side in the axial direction than the inclined portion.

\* \* \* \* \*